(12) United States Patent
Itou et al.

(10) Patent No.: US 9,316,259 B2
(45) Date of Patent: Apr. 19, 2016

(54) ROLLING BEARING WITH SEAL RING

(75) Inventors: Dai Itou, Kanagawa (JP); Satoshi Oyama, Kanagawa (JP)

(73) Assignee: NSK LTD., Tokyo (JP)

( * ) Notice: Subject to any disclaimer, the term of this patent is extended or adjusted under 35 U.S.C. 154(b) by 128 days.

(21) Appl. No.: 14/236,768

(22) PCT Filed: Aug. 2, 2012

(86) PCT No.: PCT/JP2012/069704
§ 371 (c)(1),
(2), (4) Date: Jun. 12, 2014

(87) PCT Pub. No.: WO2013/018865
PCT Pub. Date: Feb. 7, 2013

(65) Prior Publication Data
US 2014/0348455 A1 Nov. 27, 2014

(30) Foreign Application Priority Data

| Aug. 3, 2011 | (JP) | 2011-169812 |
| Jun. 5, 2012 | (JP) | 2012-127847 |
| Jul. 13, 2012 | (JP) | 2012-157576 |

(51) Int. Cl.
*F16C 33/78* (2006.01)
*F16C 33/80* (2006.01)
(Continued)

(52) U.S. Cl.
CPC ............. *F16C 33/7823* (2013.01); *F16C 19/06* (2013.01); *F16C 19/54* (2013.01);
(Continued)

(58) Field of Classification Search
USPC .................................. 384/480, 484, 485, 486
See application file for complete search history.

(56) References Cited

U.S. PATENT DOCUMENTS

| 1,917,988 | A | * | 7/1933 | Large | 384/487 |
| 4,505,484 | A | * | 3/1985 | Ohkuma et al. | 277/348 |

(Continued)

FOREIGN PATENT DOCUMENTS

| DE | 203 06 004 | 7/2003 |
| JP | 2004-144107 | 5/2004 |

(Continued)

OTHER PUBLICATIONS

International Search Report and Written Opinion dated Sep. 18, 2012 from International Application No. PCT/JP2012/069704.
(Continued)

*Primary Examiner* — Phillip A Johnson
(74) *Attorney, Agent, or Firm* — Katten Muchin Rosenman LLP

(57) ABSTRACT

Construction of a rolling bearing with seal ring can be achieved in which, while securing the required seal performance, the rotation support portion can be made more compact by shortening the dimension in the axial direction of the installation space for an inner ring 3a, and torque can be lowered. A sliding contact edge 23 of a seal lip 12a that is provided around the inner-circumferential edge portion of a seal ring 5a on one end side in the axial direction comes in sliding contact with one end surface 24 of the inner ring 3a. The tip-end edge of a protruding portion 20 closely faces the surface of the inner ring 3a, forming a labyrinth seal 19 in this portion. With this construction, a stopper ring 17 for regulating the position in the axial direction of the inner ring 3a with respect to a shaft 15 is located so as not to protrude from the end surface in the axial direction of the rolling bearing 1a with seal ring. The problem can be solved because the diameter of the sliding contact portion is kept small.

2 Claims, 8 Drawing Sheets

(51) Int. Cl.
*F16C 41/04* (2006.01)
*F16C 19/06* (2006.01)
*F16C 19/54* (2006.01)
*F16C 33/58* (2006.01)

(52) U.S. Cl.
CPC ............ *F16C 33/58* (2013.01); *F16C 33/7856* (2013.01); *F16C 33/80* (2013.01); *F16C 41/04* (2013.01); *F16C 2361/61* (2013.01)

(56) References Cited

U.S. PATENT DOCUMENTS 5,511,886 A * 4/1996 Sink ................ 384/486
7,416,343 B2 * 8/2008 Ohata et al. ............ 384/484

FOREIGN PATENT DOCUMENTS

| JP | 2006-226459 | 8/2006 |
| JP | 2006-283782 | 10/2006 |
| JP | 2007-270969 | 10/2007 |
| JP | 2008-232285 | 10/2008 |
| JP | 2009-191864 | 8/2009 |
| JP | 2010-096218 | 4/2010 |
| WO | 2011/051045 | 5/2011 |

OTHER PUBLICATIONS

International Written Opinion dated Sep. 18, 2012 from International Application No. PCT/JP2012/069704.

* cited by examiner

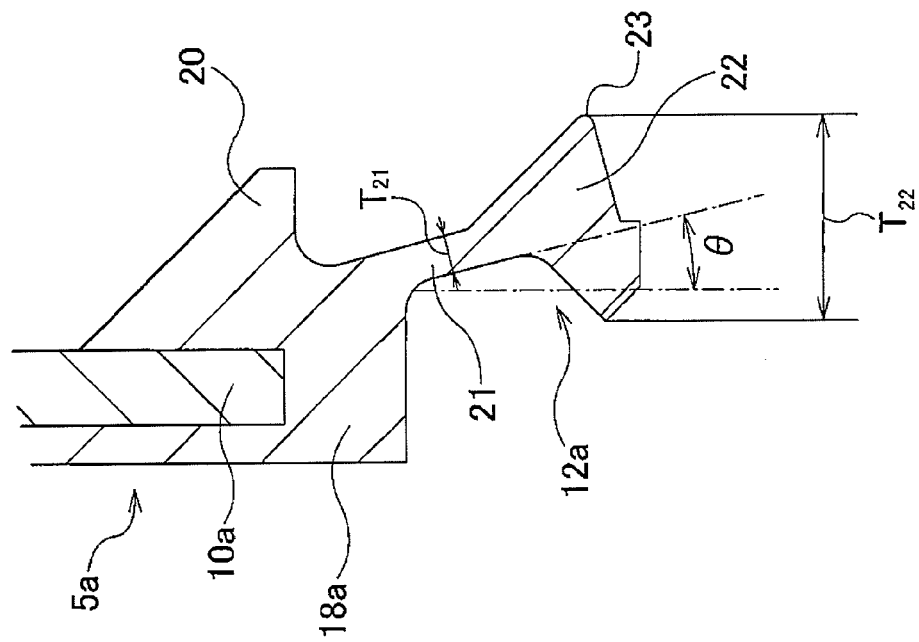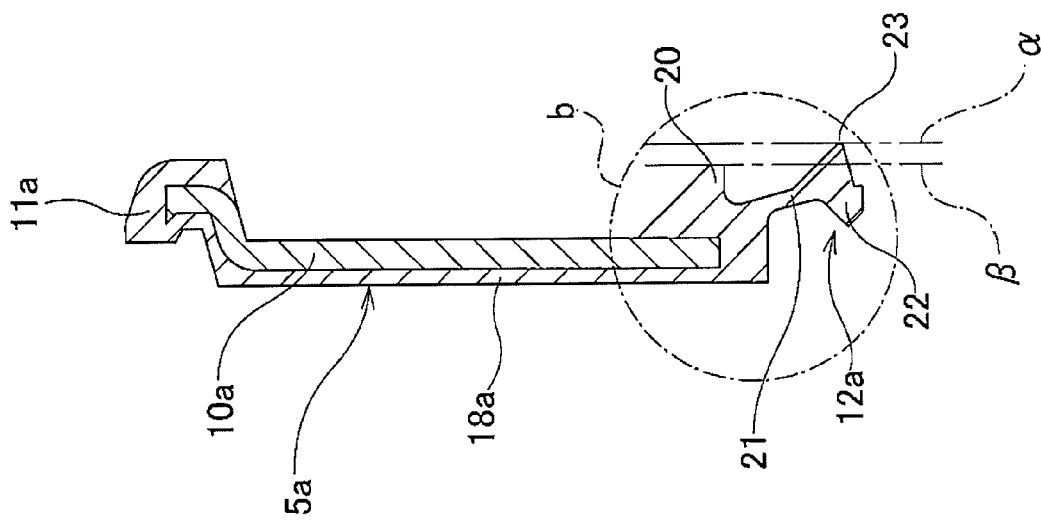

ROLLING BEARING WITH SEAL RING

TECHNICAL FIELD

The present invention relates to a rolling bearing with seal ring that is assembled in an automobile transmission and the like.

BACKGROUND ART

Many rolling bearings are assembled in an automobile transmission, however, many of those rolling bearings are operated in a state immersed in lubricant that is stored inside a transmission case. In this kind of lubricant, not only is there a possibility of the existence of foreign matter that has entered from the outside, but there is also a possibility that metallic abrasion powder that was generated in the engagement portion of the gears of the transmission is mixed therein as hard foreign matter. When this kind of hard foreign matter enters inside the rolling bearings and is bitten into the rolling contact portions between rolling surfaces and race surfaces of the rolling bearings, these rolling surfaces and race surfaces are scratched, and could become a cause of damage such as premature flaking or the like for the rolling bearing. In order to prevent this kind of damage, rolling bearings with seal rings are used as a rolling bearing in transmissions.

By using a seal ring having proper seal performance for a seal ring that is assembled in a rolling bearing with seal ring, lubricant is allowed to enter into the internal space of the rolling bearing where the rolling bodies are located, while at the same time, foreign matter that could cause damage to the rolling bearing is prevented from entering into this internal space.

As construction of a rolling bearing with seal ring that can be used for this kind of use, there is construction such as disclosed in German Utility Model No. 20,306,004, and International Publication No. WO 2011/051045. FIG. 9 illustrates the construction of the rolling bearing 1 with seal ring that is disclosed in German Utility Model No. 20,306,004. The rolling bearing 1 with seal ring comprises an outer ring 2 and inner ring 3 that are concentrically located with each other, a plurality of balls 4, each of which is a rolling body, a seal ring 5 that is located on one end side in the axial direction, and a shield ring 6 that is located on the other end side in the axial direction. The balls 4 are held in a cage 7 and arranged between an outer ring raceway 8 that is provided around the inner-circumferential surface of the outer ring 2, and an inner ring raceway 9 that is provided around the outer-circumferential surface of the inner ring 3 so as to be able to roll freely.

The contact seal ring 5 is composed of an elastic member 18 that is made using an elastomer such as rubber that is reinforced with a circular ring-shaped metal core 10 that is made of metal plate, and this seal ring 5 is such that an elastic fastening portion 11 is formed around the outer-circumferential edge portion and a seal lip 12 is formed around the inner-circumferential edge portion, with each protruding in the radial direction from the peripheral edge portions of the metal core 10. With the elastic fastening portion 11 of the seal ring 5 locked into a fastening groove 13a that is formed around the inner-circumferential surface of one end portion (left side in FIG. 9) of the outer ring 2, the tip-end edge of the seal lip 12 of the seal ring 5 comes in sliding contact all the way around a stepped surface 14a that is provided on the outer-circumferential surface of one end portion of the inner ring 3. Moreover, the non-contact shield ring 6 is formed entirely into a circular ring shape by bending metal plate. With the outer-circumferential edge portion of the shield ring 6 fastened to a fastening groove 13b that is formed around the inner-circumferential surface of the other end portion (right side in FIG. 9) of the outer ring 2, the inner-circumferential edge of the shield ring 6 comes close to and faces around the entire circumference a stepped surface 14b that is provided around the outer-circumferential surface of the other end portion of the inner ring 3. In this kind of rolling bearing 1 with seal ring, by properly regulating the location of the seal ring 5 and shield ring 6 such that, for example, the seal ring 5 is located on the side where foreign matter exists, and the shield ring 6 is located on the side where there is a low possibility that foreign matter will enter in, an effect of preventing foreign matter from entering inside, and an effect of delaying the time until serious damage occurs are obtained. It is not illustrated in the figures, however, construction is also conventionally known in which the outer-circumferential surface of the end portion of the inner ring that is separated from the inner ring raceway is a simple cylindrical surface, and the inner-circumferential edge of the seal lip comes in sliding contact with this cylindrical surface.

As illustrated in FIG. 9, when this kind of rolling bearing 1 with seal ring is assembled in rotation support portions of an automobile transmission, the inner ring 3 is fitted around the outside of a shaft 15, and a stopper ring 17 that is fastened to a fastening groove 16 that is formed around the outer-circumferential surface of the shaft 15 can be used to position the inner ring 3 in the axial direction with respect to the shaft 15. In the case of this kind of construction, the installation space of the rolling bearing 1 with respect to seal ring on the shaft 15 side increases by the amount of the thickness of the stopper ring 17, which is a disadvantage from the aspect of being able to make the automobile transmission more compact and lightweight.

RELATED LITERATURE

Patent Literature

[Patent Literature 1] German Utility Model No. 20,306,004
[Patent Literature 2] International Publication No. WO 2011/051045

SUMMARY OF INVENTION

Problem to be Solved by Invention

In consideration of the situation described above, the object of the present invention is to achieve a rolling bearing with seal ring that is able to secure the required seal characteristics, while at the same time is such that the rotation support portion can be made more compact by shortening the dimension in the axial direction of the installation space on the side of one of the races, and that, as necessary, can further reduce torque.

Means for Solving Problems

The rolling bearing with seal ring of the present invention comprises; an outer ring, an inner ring, a plurality of rolling bodies, and at least one seal ring. The outer ring is provided with an outer ring raceway around the inner-circumferential surface thereof. The inner ring is provided with an inner ring raceway around the outer-circumferential surface thereof, and is located on the inner-diameter side of the outer ring so as to be concentric with the outer ring. Moreover, the plurality of rolling bodies are located in an internal bearing space that is formed between the outer ring and the inner ring, and are arranged between the inner ring raceway and the outer ring raceway so as to be able to roll freely.

The seal ring is formed into a circular ring shape and comprises a fastening portion that is provided around one circumferential edge portion of the inner-circumferential edge and outer-circumferential edge portions, and that is fastened to at least one end portion of one of the outer ring and inner ring; and a seal lip that is made of an elastic material, and that is provided around the other circumferential edge portion of the inner-circumferential edge portion and outer-circumferential edge portion, the tip-end edge of which comes in sliding contact with one end surface of the other of the outer ring and inner ring; this seal ring separating the internal bearing space and the external space. In this way, the rolling bearing with seal ring of the present invention is characterized by employing construction in which the tip-end edge of the seal lip of the seal ring comes in sliding contact with one end surface of either of the outer ring or inner ring.

Preferably, the seal lip is provided with a plate-shaped connecting portion that is formed in a portion near the center in the radial direction than the tip-end edge; and a thick portion that is continuous from the connecting portion and has a thickness dimension that is greater than the connecting portion; such that the tip-end edge that comes in sliding contact with the one end surface is composed of an end edge in the axial direction of this thick portion.

Preferably, of the one end surface of the other of the outer ring and inner ring, the arithmetical mean surface roughness Ra of at least the portion where the tip-end edge of the seal ring comes in sliding contact is 1.0 µm or less.

Preferably, a portion of the seal ring that is near the center in the radial direction than the connecting portion, and a part of the other of the outer ring and inner ring face each other in a non-contact state, with a labyrinth seal being formed between these portions.

In this case, it is possible that the portion of the seal ring that is near the center in the radial direction is composed of a protruding portion made of elastic material that is formed so as to protrude from the side surface of the seal ring toward the surface of the other of the outer ring and inner ring, so as to form the labyrinth seal between the surface of the other of the outer ring and inner ring and the protruding portion.

In construction in which the protruding portion is provided, it is preferable in the free state of the seal ring before the fastening portion of the seal ring is fastened to the one of the outer ring and inner ring, the end edge in the axial direction of the thick portion protrudes in the axial direction further to the side of the other of the outer ring and inner ring than the protruding portion.

Alternatively, it is possible that the part of the other of the outer ring and inner ring is composed of a protruding shoulder portion that is formed so as to protrude from the one end surface of the other of the outer ring and inner ring toward the portion of the seal ring that is near the center in the radial direction, so as to form a labyrinth seal between the protruding shoulder portion of the other of the outer ring and inner ring and the side surface of the portion of the seal ring that is near the center in the radial direction.

It is preferable that the thickness dimension of the connecting portion is 1/8 to 1/3 of the thickness dimension of the thick portion.

Moreover, preferably the angle formed between the connecting portion and the one end surface of the other of the outer ring and inner ring is 0 degrees to 45 degrees.

In one embodiment of the present invention, the one end surface of the other of the outer ring and inner ring is located at a position recessed further in the axial direction than the one end surface of the one of the outer ring and inner ring. It is particularly preferred that construction be employed in which the one of the outer ring and inner ring be the outer ring, and the other of the outer ring and inner ring be the inner ring, where the fastening portion is fastened to the one end portion of the outer ring, the tip-end edge of the seal lip comes in sliding contact with the one end surface of the inner ring, and the one end surface of the inner ring is located at a position further recessed in the axial direction than the one end surface of the outer ring.

In this construction, it is preferable that a member for positioning the inner ring with respect to a shaft is located on the inner-diameter side of a portion of the one end portion of the outer ring that protrudes further than the one end surface of the inner ring.

Moreover, it is preferable that the inner ring raceway of the inner ring is composed of a deep-groove inner ring raceway, and the diameter of the sliding contact portion between the tip-end edge of the seal lip and the one end surface of the inner ring can be larger than the diameter of a groove bottom of the inner ring raceway.

Alternatively, the seal ring can be composed of the elastic member that forms at least the seal lip, and a circular ring-shaped metal core that reinforces the elastic member; and the inner diameter of the metal core can be larger than the outer diameter of the inner ring.

Furthermore, the other end surface of the outer ring can be located at a position that is further recessed in the axial direction than the other end surface of the inner ring, and the dimension of the amount that the one end surface of the inner ring is further recessed in the axial direction can be greater than the dimension of the amount that the other end surface of the outer ring is further recessed in the axial direction than the other end surface of the inner ring.

Moreover, it is preferable in an embodiment that the fastening portion is fastened to a fastening groove that is formed in the inner-circumferential surface of the one end portion of the outer ring, the tip-end edge of the seal lip comes in sliding contact with the one end surface of the inner ring, and the one end surface of the inner ring is located at the position that is further recessed in the axial direction than the one end surface of the outer ring; the rolling bearing with seal ring further comprises a second seal ring that is formed into a circular ring shape, that has: a second fastening portion that is provided around the outer-circumferential edge portion of the seal ring, and that is fastened to a fastening groove that is formed around the inner-circumferential surface of the other end portion of the outer ring; and a second seal lip that is made of an elastic material, and that is provided around the inner-circumferential edge portion of the seal ring, the tip-end edge of which comes in sliding contact with part of the inner ring; this second seal ring separating the internal bearing space from external space; and wherein by making the diameters of the second fastening portion and the second fastening groove of the second seal ring different from the diameters of the fastening portion and the fastening groove of the seal ring, error in assembling the seal ring and second seal ring is prevented.

Effect of Invention

With the rolling bearing with seal ring of the present invention, construction is employed in which one circumferential edge portion of the seal ring is fastened to one end portion of one of the outer ring or inner ring and a tip-end edge of a seal lip that is provided around other circumferential edge portion of the seal ring comes in sliding contact around the entire circumference with one end surface of the other of the outer ring or inner ring, so even when the dimension in the axial direction of the other of the outer ring or inner ring is made to be shorter than the dimension in the axial direction of the one of the outer ring or inner ring, and the position in the axial direction of the other of the outer ring or inner ring is regulated by a stopper ring, it is possible to make the rotation support portion of an automobile transmission and the like more compact, while at the same time securing the required seal performance.

Furthermore, when the seal ring is fastened to the outer ring and the tip-end edge of the seal lip comes in sliding contact with one end surface of the inner ring, it is possible to make the diameter of the sliding contact portion between the tip-end edge of the seal lip and the one end surface of the inner ring smaller than in the case of conventional construction, and thus the resistance (dynamic torque) of this sliding contact portion can be kept small, and the torque of the rolling bearing with seal ring can be lowered by that amount.

BRIEF DESCRIPTION OF DRAWINGS

FIG. 2A is a partial cross-sectional view of a seal ring for explaining a preferred shape of the seal lip in embodying the present invention; and FIG. 2B is an enlarged view of portion "b" in FIG. 2A.

MODES FOR CARRYING OUT INVENTION

First Example

Figure 1A:
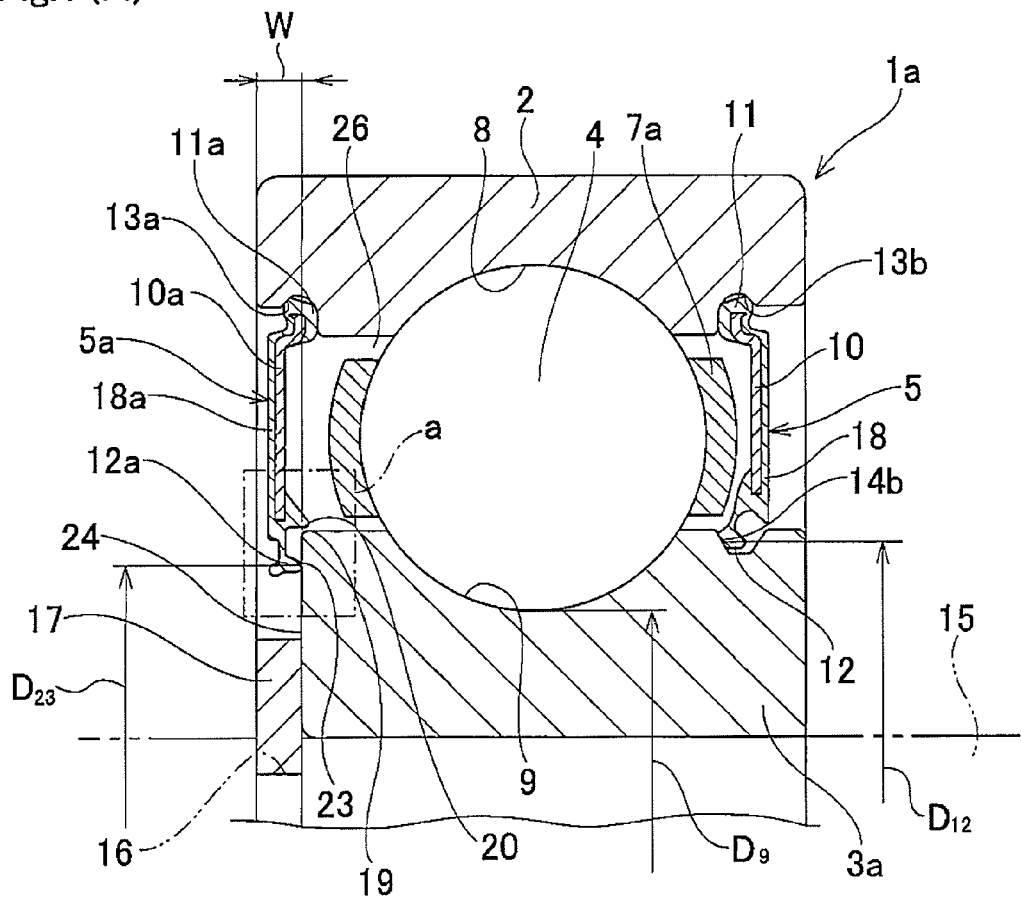
FIG. 1A is a partial cross-sectional view illustrating a first example of an embodiment of the present invention.
Figure 1B:
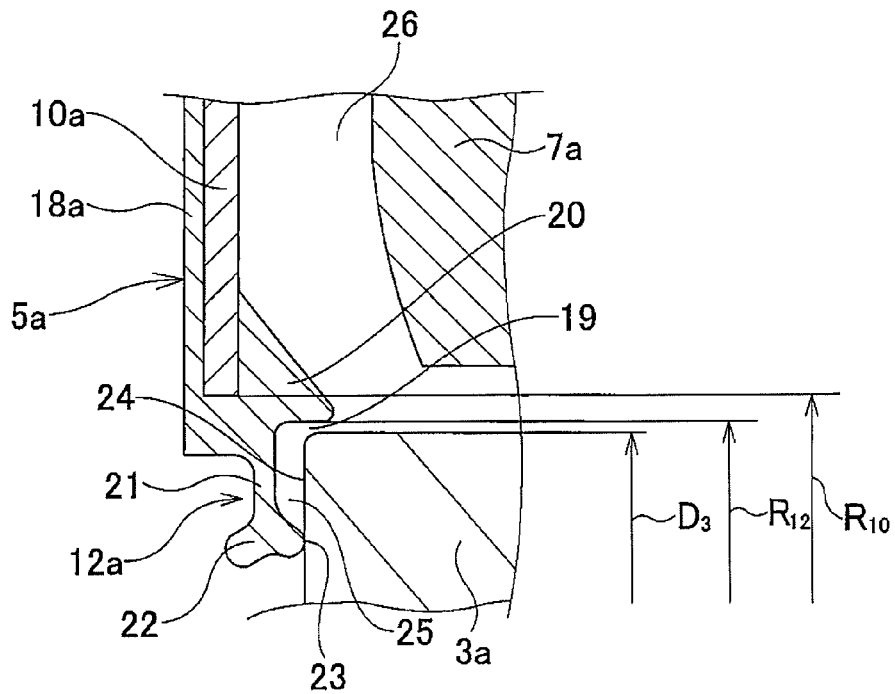
FIG. 1B is an enlarged view of portion "a" in FIG. 1A.
Figure 3A:
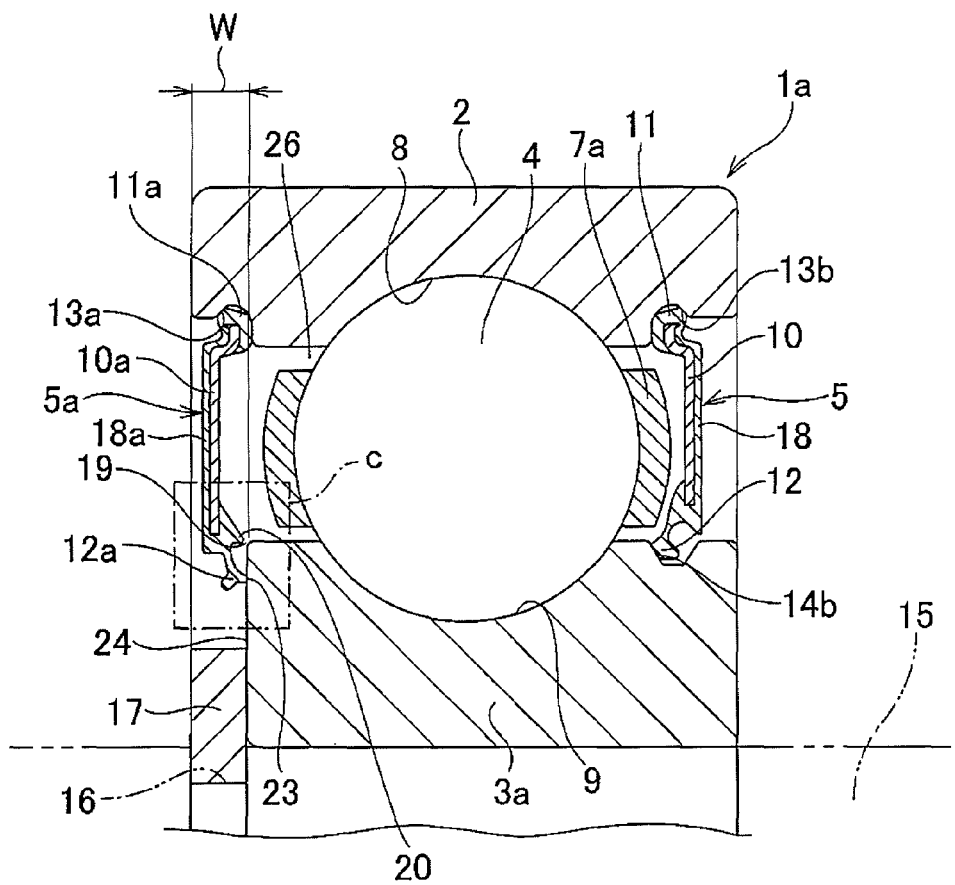
FIG. 3A is a partial cross-sectional view of the construction in which the dimensions of the protruding portion that constitutes the seal ring differ from that of the construction illustrated in FIG. 1A.
Figure 3B:
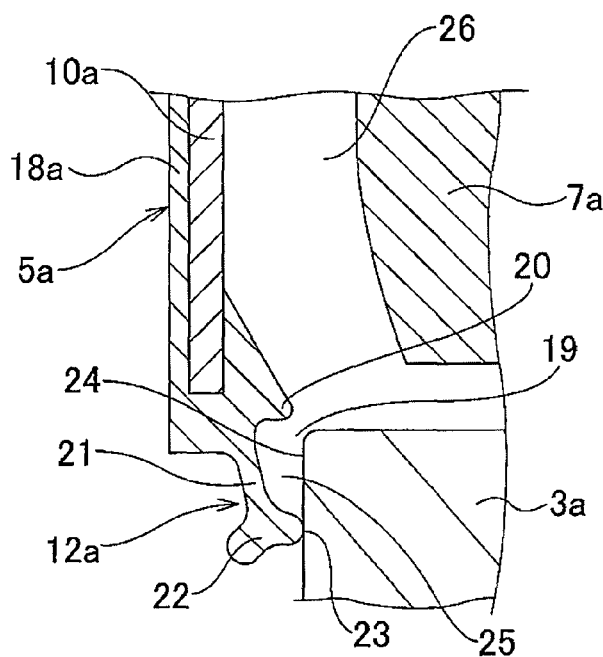
FIG. 3B is an enlarged view of portion "c" in FIG. 3A.

FIG. 1A to FIG. 5 illustrate a first example of an embodiment of the present invention and variations thereof. The rolling bearing with seal ring of this example has: an outer ring 2 having an outer ring raceway 8 formed around the inner-circumferential surface thereof, an inner ring 3a having an inner ring raceway 9 formed around the outer-circumferential surface thereof, and arranged on the inner-diameter side of the outer ring 2 so as to be concentric with the outer ring 2; a plurality of rolling bodies 4 that are formed inside an internal space 26 of the bearing that is defined by the outer ring 2 and the inner ring 3a, and are located between the inner ring raceway 9 and outer ring raceway 8 so as to be able to roll freely; and a seal ring 5a formed into a circular ring shape and having a fastening portion 11a that is provided around the outer-circumferential edge portion, which is one circumferential edge portion of the inner-circumferential edge portion and outer-circumferential edge portion, and is fastened to at least one end portion of the outer ring 2, and a seal lip 12a that is made of an elastic material and is provided around the inner-circumferential edge portion, which is the other circumferential edge portion of the inner-circumferential edge portion and outer-circumferential edge portion. In this example, the tip-end edge of this seal lip 12a comes in sliding contact with the one end surface 24 of the inner ring 3a instead of a stepped surface 14a that is provided around the outer-circumferential surface on one end portion of the inner ring 3 as in the construction in FIG. 9, or the outer-circumferential surface (cylindrical surface) of one end portion of the inner ring as in other conventional construction. With this construction, the seal ring 5a separates the internal space 26 of the bearing and the external space.

Figure 9:
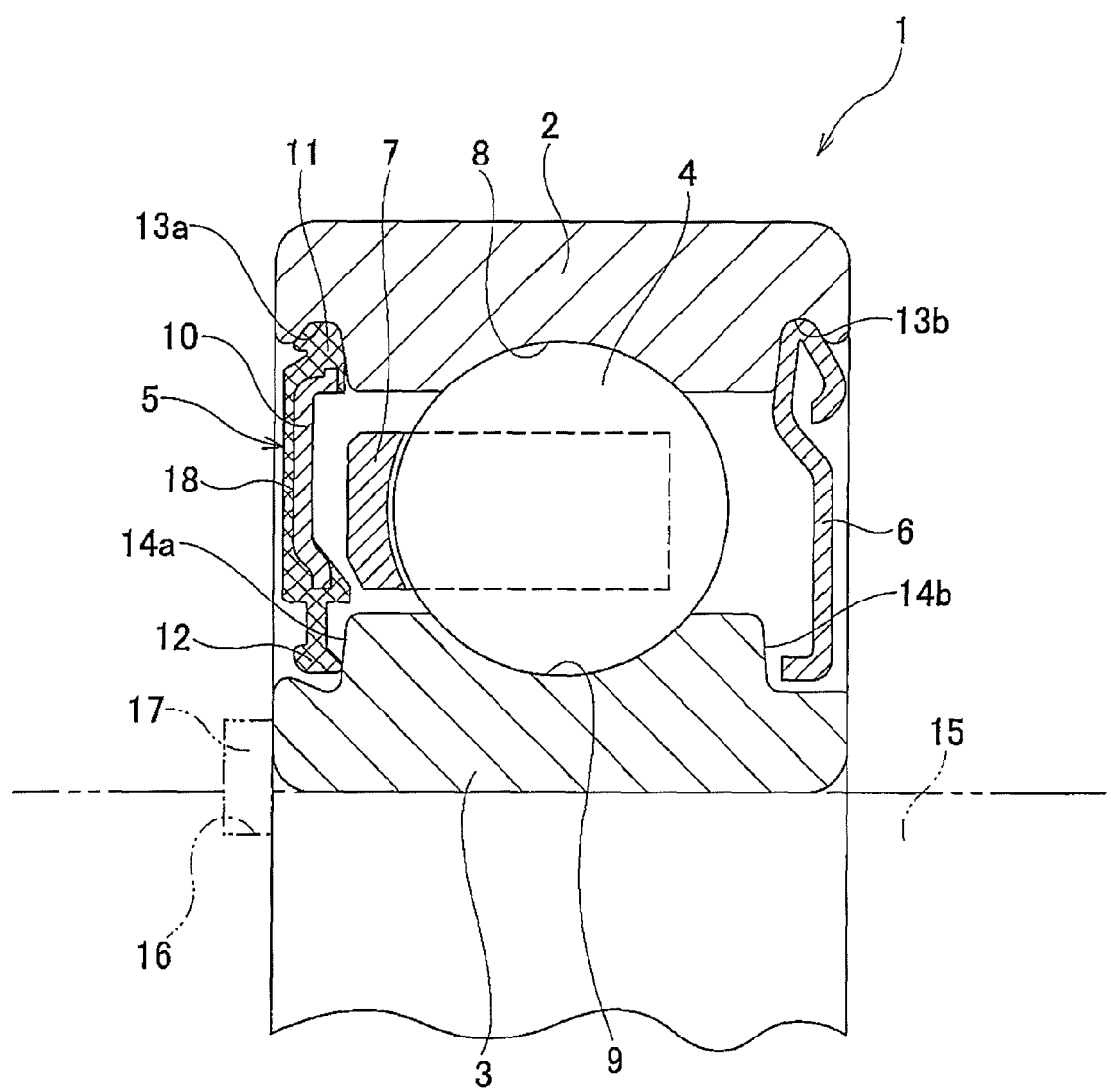
FIG. 9 is a partial cross-sectional view illustrating an example of conventional construction.

The basic construction of the rolling bearing with seal ring of the present invention, including this example, is mostly the same as that of the conventional construction illustrated in FIG. 9, so explanations related to identical portions are omitted or simplified. In the case of this example, a wave-shaped pressed cage is used as a cage 7a for holding the balls so as to be to roll freely, however, the example is not limited to this, and it is also possible to use a cage having various conventionally known construction such as a crown shaped cage, a machined cage, a basket cage and the like. Furthermore, the construction of this example is not limited to a single-row deep-groove ball bearing such as illustrated in the drawings, and it is also possible to apply this construction to a double-row ball bearing, an angular ball bearing, a cylindrical roller bearing, a conical roller bearing, or a spherical roller bearing.

In the rolling bearing 1a with seal ring of this example, the dimension in the axial direction of the inner ring 3a is shorter than the dimension in the axial direction of the outer ring 2. When the rolling bearing 1a with seal ring is in an assembled state, the one end surface 24 (left-end surface in FIG. 1) in the axial direction of the inner ring 3a is located in a position that is further recessed in the axial direction than the one end surface in the axial direction of the outer ring 2, or in other words in the portion near the center in the axial direction of the rolling bearing 1a with seal ring. The dimension W of the amount that the one end surface 24 of the inner ring 3a is further recessed toward the center side in the axial direction of the rolling bearing 1a with a seal ring than the one end surface of the outer ring 2 is not particularly limited. However, in the assembled state of the seal ring 5a, and with the seal lip 12a elastically deformed, this dimension W is preferably limited to a size such that the seal ring 5a does not protrude further outward in the axial direction than the one end surface of the outer ring 2. On the other hand, the other end surfaces in the axial direction of the inner ring 3a and outer ring 2 (surfaces on the right end in FIG. 1) are nearly on the same plane except for minute manufacturing error.

The outer-circumferential edge portion of the seal ring 5a is fastened to one fastening groove 13a of a pair of fastening grooves 13a, 13b that are formed on both end portions in the axial direction of the inner-circumferential surface of the outer ring 2, and the outer-circumferential edge portion (second fastening portion) of a seal ring 5, which basically corresponds to that of the conventional construction illustrated in FIG. 9, is fastened to the other fastening groove (second fastening groove) 13b. However, it is also possible to attach a seal ring, which corresponds to the seal ring 5a that is attached to the one fastening groove 13a, to the other fastening groove 13b. Moreover, when the path by which foreign matter enters in is limited to only the one end side, it is also possible to attach a non-contact shield ring to the other fastening groove 13b, or omit the seal ring and shield ring on the other end side. A feature of the present invention is that at least the tip-end edge of the seal lip that constitutes the seal ring on the one end side in the axial direction that is attached to one bearing ring (outer ring 2 in the example in the figure) comes in sliding contact with the end surface in the axial direction of the other bearing ring (inner ring 3a in the example in the figure), and the construction of the other end side in the axial direction is arbitrary and depends on what the rolling bearing with seal ring will be used for.

Figure 5:
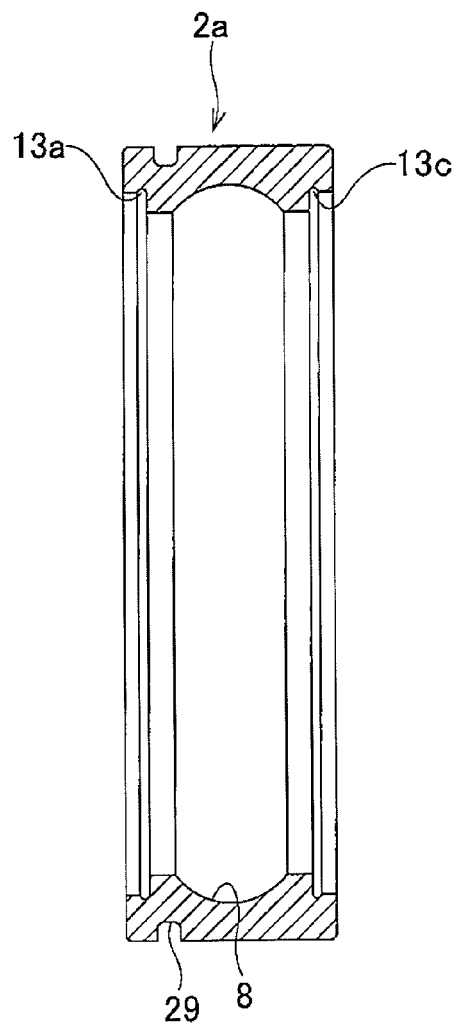
FIG. 5 is a cross-sectional view for explaining the preferable dimensional relationship of an outer ring when embodying the present invention.

In the case where different types of seal rings (or shield rings) are mounted on both end portions in the axial direction of the rolling bearing with seal ring and the assembly of these seal rings in the one ring (outer ring 2 in the example in the figure) is basically the same, it is preferable to take measures for preventing reversed assembly. For example, as illustrated in FIG. 5, when different types of seal rings are attached to the fastening grooves 13a, 13c that are formed around the inner-circumferential surfaces on both end portions of an outer ring 2a having a shape that is non-symmetrical in the axial direction, the inner diameters of the fastening grooves 13a, 13c are made to differ by an amount such that a seal ring other than a seal ring that is to be properly attached cannot be attached. For example, when the inner diameter of the outer ring 2a is about 50 mm to 70 mm, by making the inner diameters of the fastening grooves 13a, 13c differ by about 1 mm to 2 mm, it is possible to prevent attaching an improper seal ring. It is preferable that the difference between the inner diameters of the fastening grooves 13a, 13c is as small as possible as long as attachment error can be prevented. Moreover, making the color of the elastic material of the different seal rings different is also effective in preventing attachment error. Furthermore, in the case where the inner diameters of the fastening grooves 13a, 13c are made to be different and a stopper-ring groove 29 is formed in the portion near the end portion of the outer-circumferential surface of the outer ring 2a as illustrated in FIG. 5, it is preferable to make the inner diameter of the fastening groove on the side near the stopper-ring groove 29 (fastening groove 13a in the example in the figure) smaller from the aspect of securing the strength of the outer ring 2a (thickness between the stopper-ring groove 29 and the fastening groove 13a). In the example of a variation illustrated in FIG. 5, one of the fastening grooves 13a, 13c constitutes a second fastening groove, and a second fastening portion that is provided around the outer-circumferential edge portion of the second seal ring is fastened in this second fastening groove, and the tip-end edge of a second seal lip made of an elastic material that is provided around the inner-circumferential edge portion of the second seal ring comes in sliding contact with part of the inner ring 3a.

The seal ring 5a is composed of an elastic member 18a that is made of an elastomer such as rubber and that is reinforced by a circular ring shaped metal core 10a that is made of metal plate, and an elastic fastening portion 11a is formed around the outer-circumferential edge portion of the metal core 10a, and a seal lip 12a is formed around the inner-circumferential edge portion of the metal core 10a in a state such that each respectively protrudes further in the radial direction than the outer-circumferential edge portion or inner-circumferential edge portion of the metal core 10a. The construction of the elastic fastening portion 11a corresponds to that of the conventional construction illustrated in FIG. 9, however, the construction of the seal lip 12a is different than in the conventional construction illustrated in FIG. 9.

In this example, in addition to the seal lip 12a, a protruding portion 20 for forming a labyrinth seal 19 is provided in the portion of the elastic member 18a that protrudes further inward in the radial direction than the inner-circumferential edge of the metal core 10a, around the entire circumference so as to protrude toward the surface of the inner ring 3a. The seal lip 12a is such that a thick portion 22 is provided around the entire circumference of the inner-circumferential edge portion of a plate shaped connecting portion 21 that is composed of the portion near the center in the radial direction (portion near the outside in the radial direction), and this thick portion 22 has a thickness dimension that is greater than that of the connecting portion 21. The edges on both ends in the axial direction of this thick portion 22 protrudes further in the axial direction than both side surfaces of the connecting portion 21, and the end edge on the inner ring 3a side forms a sliding contact edge 23, which is the tip-end edge of the seal lip 12a that comes in sliding contact with the one end surface 24 of the inner ring 3a.

With the elastic fastening portion 11a fastened to one fastening groove 13a, the tip-end edge of the seal lip 12a, more specifically, the sliding contact edge 23 of the thick portion 22 of the seal lip 12a comes in sliding contact around the entire circumference with the one end surface 24 of the inner ring 3a. The one end surface 24 of one end of the inner ring 3a is a very flat smooth surface having an arithmetical mean surface roughness Ra of 1.0 μm or less. With this contact, the sliding contact state between the one end surface 24 and the tip-end edge (sliding contact edge 23 of the thick portion 22) of the seal lip 12a is stabilized, and together with improving the seal characteristics of the seal lip 12a, wear of the tip-end edge of the seal lip 12a is suppressed. The one end surface 24 is a flat surface that is exposed to the outside, so the machining process for making the one end surface 24 a very flat smooth surface is simple. In other words, in the case of the conventional construction illustrated in FIG. 9, the stepped surface 14a with which the tip-end edge of the seal lip 12 comes in sliding contact is provided around the outer-circumferential surface of the inner ring 3 in a recessed state inward in the radial direction, so finishing the stepped surface 14a into a very flat smooth surface by normal side grinding is difficult. On the other hand, in the case of the construction of the present invention, the machining process for making the one end surface 24 a very flat smooth surface can be performed easily and at low cost by normal side grinding.

Taking into consideration heat resistance up to about 130° C., it is preferable that acrylic rubber (ACM) is used as the elastomer for the elastic member 18a, however, in the case of operating in a condition of 100° C. or less, a low-cost nitrile rubber (NBR) can also be used. Moreover, in conditions where the temperature during operation exceeds 130° C., silicon rubber (VMQ) can also be used, and furthermore, under conditions where the temperature during operation exceeds 150° C., fluororubber (FKM) can also be used. In short, taking into consideration operating conditions such as heat resistance, oil resistance, and alkali resistance, or taking into consideration cost, the elastomer can be appropriately selected from elastomers that have conventionally been used for a seal ring of a rolling bearing.

In the case of this example, in addition to the seal lip 12a, a protruding portion 20 for forming a labyrinth seal is provided around the entire circumference of the elastic member 18a in the portion that protrudes further inward in the radial direction than the inner-circumferential edge of the metal core 10a. In other words, the protruding portion 20 is formed in part of the seal ring 5a in a portion near the center in the radial direction than the connecting portion 21 of the seal lip 12a (portion near the outside in the radial direction), and in a portion that faces part of the inner ring 3a (outer-circumferential surface of one end portion) in a state of no contact. Therefore, a labyrinth seal 19 is formed between the protruding portion 20 and part of the inner ring 3a. The protruding portion 20 has an inner diameter $R_{12}$ that is a little greater than the outer diameter $D_3$ of the end portion (shoulder portion) of the inner ring 3a ($D_3 < R_{12}$). The inner diameter $R_{10}$ of the metal core 10a is greater than the outer diameter $D_3$ of the end portion in the axial direction (shoulder portion) of the inner ring 3a ($R_{10} > D_3$), and thus the degree of freedom of the elastic deformation of the portion near the inner diameter of the elastic member 18a, including the seal lip 12a, is secured.

In this example the shape and dimensional relationship of the seal lip 12a, connecting portion 21 and protruding portion 20 is regulated as follows. First, in the free state of the seal lip 12a before the elastic fastening portion 11a, which is the fastening portion of the seal ring 5a, is fastened to the fastening groove 13a, the sliding contact edge 23, as illustrated in FIG. 2A, exists on the chain line α. However, the tip-end edge of the protruding portion 20 exists on the chain line β in FIG. 2A. In other words, in the free state of the seal lip 12a, the sliding contact edge 23 protrudes further in the axial direction toward the inner-ring 3a side than the tip-end edge of the protruding portion 20.

The thickness $T_{21}$ of the connecting portion 21 is ⅛ to ⅓ of the thickness $T_{22}$ of the thick portion 22 ($T_{22}/8 \leq T_{21} \leq T_{22}/3$). By regulating the thickness $T_{21}$ of the connecting portion 21 within this range, it is possible to secure followability of the seal lip 12a, and achieve a low torque. When the thickness $T_{21}$ of the connecting portion is taken to be less than ⅛ the thickness $T_{22}$ of the thick portion 22 ($T_{21} < T_{22}/8$), it becomes difficult to sufficiently secure durability of the seal lip 12a. On the other hand, when the thickness $T_{21}$ of the connecting portion 21 is taken to be greater than ⅓ of the thickness $T_{22}$ of the thick portion 22 ($T_{21} > T_{22}/3$), the bending rigidity of the connecting portion 21 becomes high, and the friction resistance in the sliding contact portion between the sliding contact edge 23 and the one end surface 24 of the inner ring 3a becomes large.

Moreover, from the aspect of followability of the seal lip 12a and lowering the torque, in the free state of the seal lip 12a, preferably the angle θ between the connecting portion 21 and the one end surface 24 of the connecting portion 21 (in the radial direction) is regulated to be 0 degrees to 45 degrees ($0° \leq θ \leq 45°$). When this angle θ is greater than 45 degrees (θ>45°), the surface pressure in the sliding contact portion between the sliding contact edge 23 and the one end surface 24 may become high.

However, as illustrated in FIG. 1, in a state where the elastic fastening portion 11a is fastened to the fastening groove 13a, and with the connecting portion 21 of the seal lip 12a elastically deformed, the sliding contact edge 23 is pressed against the one end surface 24 of the inner ring 3a around the entire circumference due to the elasticity of the connecting portion 21. Moreover, in this state, the tip-end edge of the protruding portion 20 is located further on the center side in the axial direction of the inner ring 3a than the one end surface 24. In this state, the tip-end edge of the protruding portion 20 and the corner portion (outer-circumferential edge of the one end surface 24) of the inner ring 3a closely face each other. As a result, a space that will become a labyrinth seal 19 is formed around the entire circumference of the portion between the tip-end edge of the protruding portion 20 and the corner portion of the inner ring 3a. A space 25 having a width dimension that is larger than the labyrinth seal 19 exists in the portion in the axial direction between the connecting portion 21 and the one end surface 24. With the existence of this space 25, it is possible to increase the sealing effect of this labyrinth seal 19.

The diameter of the sliding contact edge 23 is regulated from the aspect of lowering torque while at the same time preventing interference with other parts such as the stopper ring 17 that positions the rolling bearing 1a with seal ring with respect to the shaft 15, and securing the necessary seal performance. In other words, the smaller the diameter $D_{23}$ of the sliding contact edge 23 is, the more the friction resistance (dynamic torque) that occurs in the sliding contact portion between the sliding contact edge 23 and the one end surface 24 is suppressed. The effect of reducing the dynamic torque by reducing the diameter $D_{23}$ of this sliding contact edge 23 cannot be obtained unless the diameter $D_{23}$ is less than diameter $D_{12}$ of the sliding contact portion between the tip-end edge of the seal lip 12 of the seal ring 5 that corresponds to the conventional construction and a stepped surface 14b ($D_{23} < D_{12}$). In other words, unless the diameter $D_{23}$ of the sliding contact edge 23 is less than that of the conventional construction, it is not possible to lower the torque compared with the conventional construction. Even by only properly regulating the diameter of the sliding contact edge 23, it is possible to lower the torque of the rolling bearing 1a with seal ring, however, by properly regulating both the construction and dimensions of the seal lip 12a, it is possible to synergistically obtain the effect of lowering the torque.

However, a positioning member, such as the stopper ring 17, regulates the position in the axial direction of the inner ring 3a and comes in contact with the one end surface 24. In this case, as long as the positioning member comes in contact with the portion of the inner ring 3a that has high rigidity in the axial direction, or more specifically, it is sufficient for the positioning member that the portion near the inner diameter than the groove bottom portion of the deep-groove inner ring raceway 9 that is formed around the outer-circumferential surface of the inner ring 3a. In other words, it is meaningless to locate the positioning member exist further on the outside in the radial direction than the groove bottom portion. Taking this into consideration, by making the diameter $D_{23}$ of the sliding contact edge 23 larger than the diameter $D_9$ of the groove bottom portion of the inner ring raceway 9 ($D_{23} > D_9$), it is possible to prevent interference between the positioning member and the inner-circumferential edge of the seal lip 12a. Therefore, it is preferable that the diameter $D_{23}$ of the sliding contact edge 23 is regulated by the relationship between the diameter $D_9$ of the groove bottom portion of the inner ring raceway 9 and the diameter $D_{12}$ of the sliding contact portion between the tip-end edge of the seal lip 12 of the seal ring 5 and the stepped surface 14b, so as to be $D_9 < D_{23} < D_{12}$.

Moreover, it is preferable that the diameter and the height in the axial direction of the protruding portion 20 are properly regulated from the aspect of preventing interference with the inner ring 3a and the like, and securing the sealing performance of the labyrinth seal 19. In the case of the construction illustrated in FIGS. 1A and 1B, the inner diameter of the protruding portion 20 is just a little larger than the outer diameter of the end portion (shoulder portion) in the axial direction of the inner ring 3a, the height in the axial direction of the protruding portion 20 is such that the tip-end portion is positioned around this shoulder portion, and it is possible to make the thickness in the radial direction of the space of the labyrinth seal 19 sufficiently small while preventing rubbing between the outer-circumferential surface of the shoulder portion and the inner-circumferential surface of the protruding portion 20. Furthermore, preferably, from the aspect of preventing interference with the cage 7a, it is preferable that the outer diameter and the height in the axial direction of the protruding portion 20 are also properly regulated. However, in the case of the construction illustrated in FIGS. 3A and 3B, the inner diameter and the height in the axial direction of the protruding portion 20 is smaller than in the case of the construction illustrated in FIGS. 1A and 1B, and the tip-end edge of the protruding portion 20 is made to closely face the corner portion of the shoulder portion of the inner ring 3a, and this portion is taken to be the labyrinth seal 19. Which construction to apply is appropriately determined according to design considerations, and by keeping a balance between the seal performance required for the labyrinth seal 19 and making the bearing compact and lightweight. Chamfering (R chamfering) having a ¼ arc shaped cross portion is performed on the corner portion that connects the one end surface 24 of the inner ring 3a and the outer-circumferential surface of the shoulder portion, so that even when the elastic member 18a rubs against this corner portion, the elastic member 18a is not damaged.

With the rolling bearing 1a with seal ring of this example, it is possible to shorten the dimension in the axial direction of the installation space of the inner ring 3a with respect to the shaft 15, while at the same time secure the required seal performance. In other words, the dimension in the axial direction of the inner ring 3a is shortened to be less than the dimension in the axial direction of the outer ring 2, so that one end side in the axial direction of the outer ring 2 is caused to protrude (overhang) further in the axial direction than the inner ring 3a. That is, the one end surface 24 of the inner ring 3a is located at a position that is recessed in the axial direction (portion near the center in the axial direction). As a result, the stopper ring 17, which is a member for positioning the inner ring 3a with respect to the shaft 15, can be located on the inner-diameter side of the portion of the one end portion in the axial direction of the outer ring 2 that protrudes further than the one end surface 24 of the inner ring 3a. Therefore, the rotation support portion in which a rolling bearing with seal ring is assembled, including a stopper ring 17, can be made compact.

Moreover, the sliding contact edge 23 of the seal lip 12a that is provided around the inner-circumferential edge portion of the seal ring 5a that covers the opening on one end side in the axial direction of the internal bearing space 26 where balls 4 are located comes in sliding contact with the one end surface 24 of the inner ring 3a, so even when the dimension in the axial direction of the inner ring 3a is shortened, it is possible to secure the required seal performance. A labyrinth seal 19 is provided between the portion near the outside in the radial direction (near the center in the radial direction of the seal ring 5a) than the sliding contact edge 23 and the surface of the inner ring 3a, so the sealing capability of the seal ring 5a can be sufficiently secured.

Furthermore, the diameter $D_{23}$ of the sliding contact edge 23 of the seal lip 12a is less than the diameter $D_{12}$ of the sliding contact portion between the tip-end edge of the seal lip and the stepped surface in conventional construction ($D_{23} < D_{12}$), so a moment due to friction between the sliding contact edge 23 and the one end surface 24 is kept small, and it is possible to lower the torque of the rolling bearing 1a with seal ring.

In addition, the half portion in the outer-diameter side of the seal lip 12a functions as the thin connecting portion 21, so both securing the required seal performance and lowering the torque can be achieved to a high degree. In other words, the bending rigidity of the connecting portion 21 is low, so even when there is relative displacement between the outer ring 2 and the inner ring 3a, the ability of the sliding contact edge 23 to follow the one end surface 24 is high, and it is possible to make it difficult for gaps to occur between these; also, even when the interference (amount of elastic deformation of the seal lip 12a) when the sliding contact edge 23 comes in sliding contact with the one end surface 24 is large, the surface pressure of this sliding contact portion is kept low. Therefore, when the rolling bearing 1a with seal ring is assembled in a rotation support portion of a transmission, for example, it is possible to sufficiently prevent foreign matter such as abrasion powder from getting inside the rolling bearing 1a with seal ring, while at the same time keep the dynamic torque of the rolling bearing 1a with seal ring low.

Figure 4A:
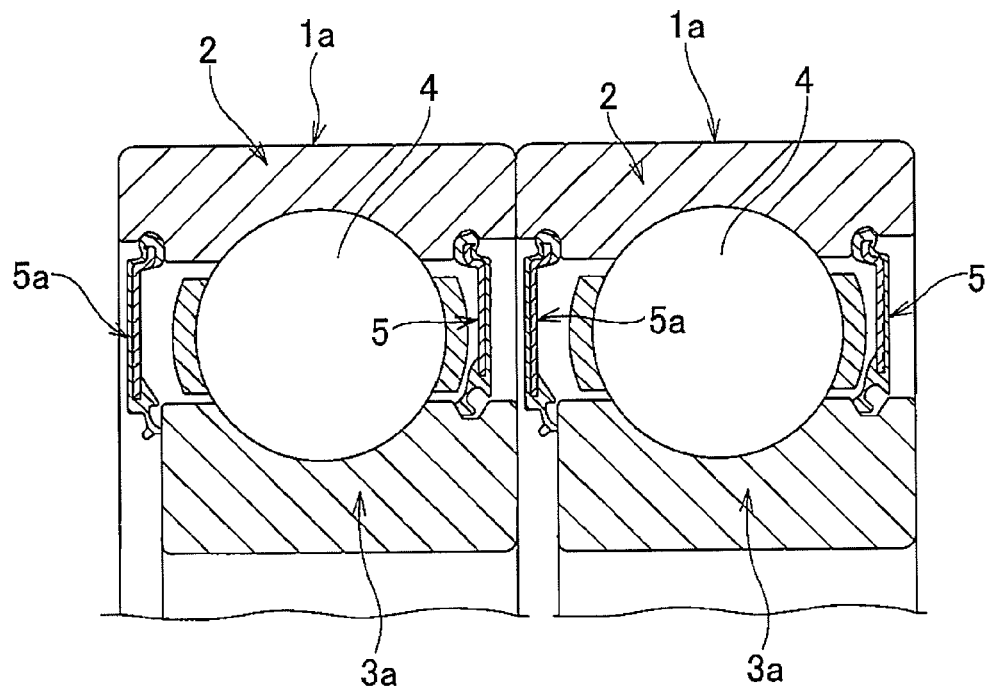
FIG. 4A is a partial cross-sectional view illustrating an example of the first example in a state in which a plurality of rolling bearings with seal ring are placed together in the axial direction and transported.
Figure 4B:
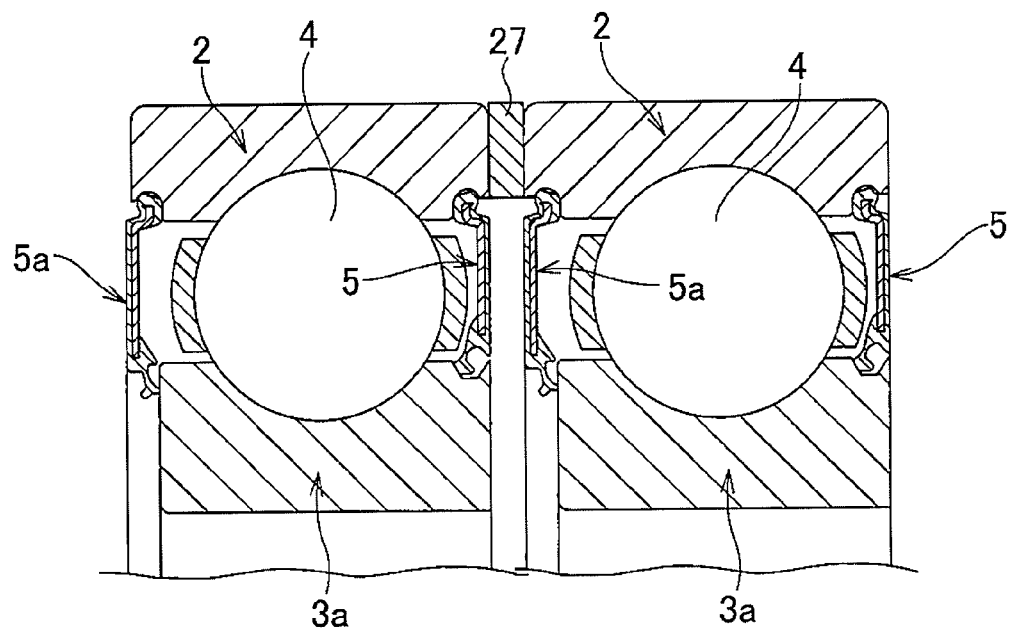
FIG. 4B is a partial cross-sectional view of another example.

In the construction of this example, the seal lip 12a is located in the portion that protrudes in the axial direction from the one end surface 24 of the inner ring 3a, however, the seal ring 5a, including the seal lip 12a, does not protrude further in the axial direction than the one end portion in the axial direction of the outer ring 2. Therefore, when transporting many rolling bearings 1a with seal ring from a manufacturing plant where the rolling bearings 1a with seal rings are manufactured to a transmission assembly plant, even when placing together rolling bearings 1a with seal rings in the axial direction as illustrated in FIG. 4A, the seal ring 5a does not interfere with part of the adjacent rolling bearing 1a with seal ring, so it is possible to prevent damage to the seal ring 5a. Therefore, even when the construction of this example is employed, the efficiency of the work for transporting rolling bearings 1a with seal rings does not become bad. Moreover, differing from the construction of this example, even when construction is used in which the seal ring 5a protrudes further in the axial direction than one end portion in the axial direction of the outer ring 2, by placing a ring-shaped spacer 27 between adjacent outer rings 2 as illustrated in FIG. 4B, it is possible to keep the worsening of the efficiency of the transport work to a minimum.

Second Example

Figure 6:
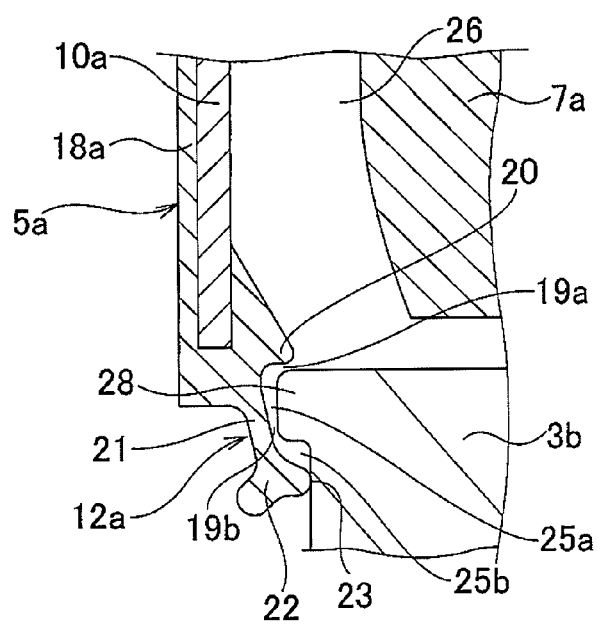
FIG. 6 is a view that corresponds to FIG. 1B, and illustrates a second example of an embodiment of the present invention.

FIG. 6 illustrates a second example of an embodiment of the present invention. In this example, a protruding shoulder portion 28 that has a rectangular cross section is formed around the entire circumference of the outer end portion in the radial direction of the one end surface of the inner ring 3b. The protruding shoulder portion 28 enters into a concave groove shaped portion of the inside surface of the elastic member 18a of the seal ring 5a (surface facing the internal space 26 of the bearing) that is located between the protruding portion 20 and the thick portion 22 on the tip end of the seal lip 12a, and labyrinth seals 19a, 19b are formed at two locations in the radial direction of the portions that the protruding shoulder portion 28 and concave groove shaped portion of the seal lip 12a face each other. The portion between the labyrinth seals 19a, 19b is taken to be a space 25a having a width dimension is greater than the portion of the labyrinth seals 19a, 19b, and the portion between the protruding shoulder portion 28 and the thick portion 22 is taken to be a space 25b having a width dimension that is greater than the portion of the labyrinth seals 19a, 19b.

In the construction of this example, a pair of labyrinth seals 19a, 19b are formed between the internal space 26 of the bearing and the outer space in series with the contact seal portion with the sliding contact edge 23 of the thick portion 22. Therefore, it is possible to improve the seal performance, while at the same time it is possible to suppress an increase in the dynamic torque of the rolling bearing with seal ring. Chamfering having an arc shaped cross section is performed on both the inner-circumferential edge portion and outer-circumferential edge portion of the tip-end surface of the protruding shoulder portion 28, so even when there is rubbing between the protruding shoulder portion 28 and the elastic member 18a, the elastic member 18a is not damaged.

Moreover, in the case of this example, the portion of the surface of one end of the inner ring 3b near the inner diameter than the protruding shoulder portion 28 is a very flat smooth surface having an arithmetical mean surface roughness Ra of 1.0 μm or less. On the other hand, the tip-end surface and inner circumferential surface of the protruding shoulder portion 28 do not have to be very smooth flat surfaces. The construction and functions of the other parts are the same as in the first embodiment.

Third Example

Figure 7:
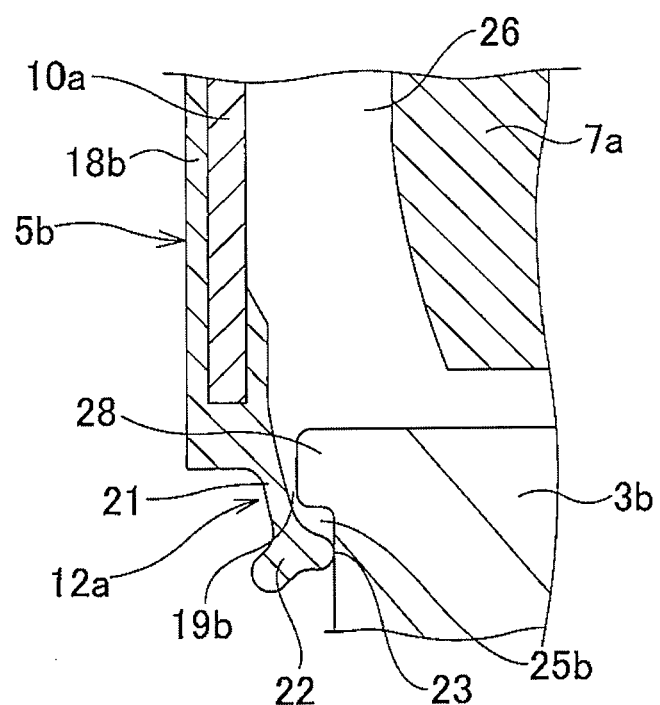
FIG. 7 is a view that corresponds to FIG. 1B, and illustrates a third example of an embodiment of the present invention.

FIG. 7 illustrates a third example of an embodiment of the present invention. This example is a variation of the second example. In this example, differing from the second example, a protruding portion 20 is not provided on the inside surface of the elastic member 18b of the seal ring 5b. The construction of this example has inferior seal performance compared with that of the second example, however, as long as there is no particular need for a high level of seal performance, sufficient seal performance can be obtained. Moreover, it is possible to keep the manufacturing cost of the seal ring 5b lower due to the elimination of the protruding portion 20. The construction and functions of the other parts are the same as in the second embodiment.

Fourth Example

Figure 8A:
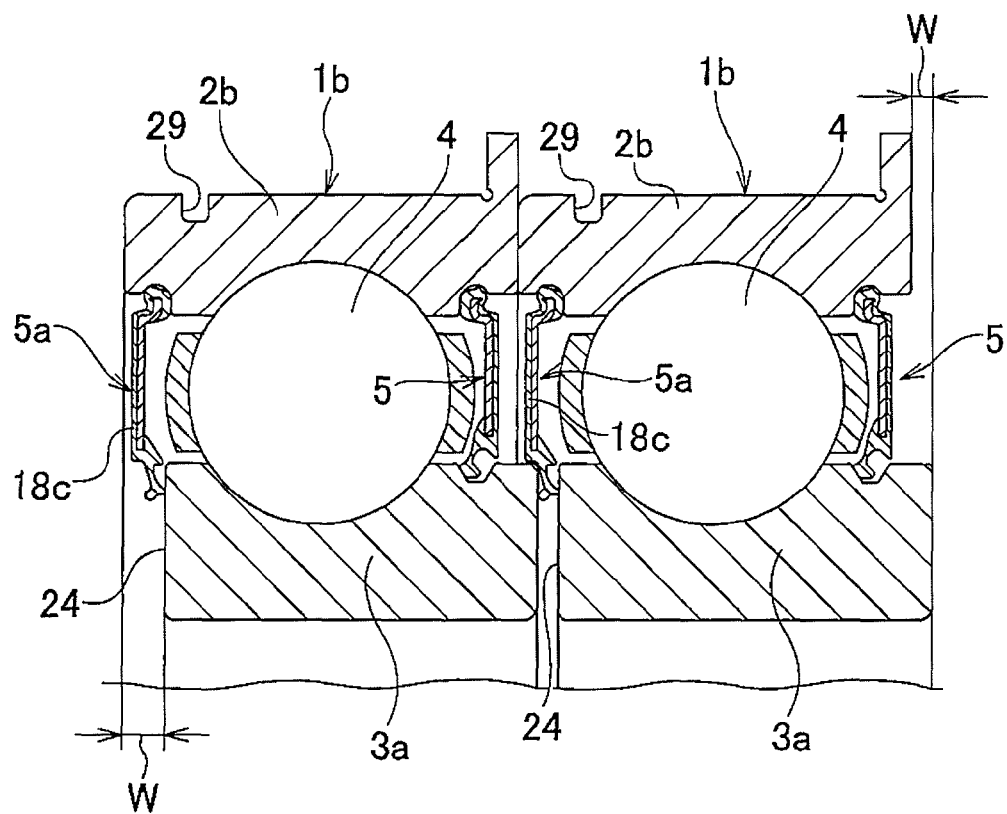
FIG. 8A is a partial cross-sectional view illustrating an example of the fourth example state in which a plurality of rolling bearings with seal rings are placed together in the axial direction and transported.
Figure 8B:
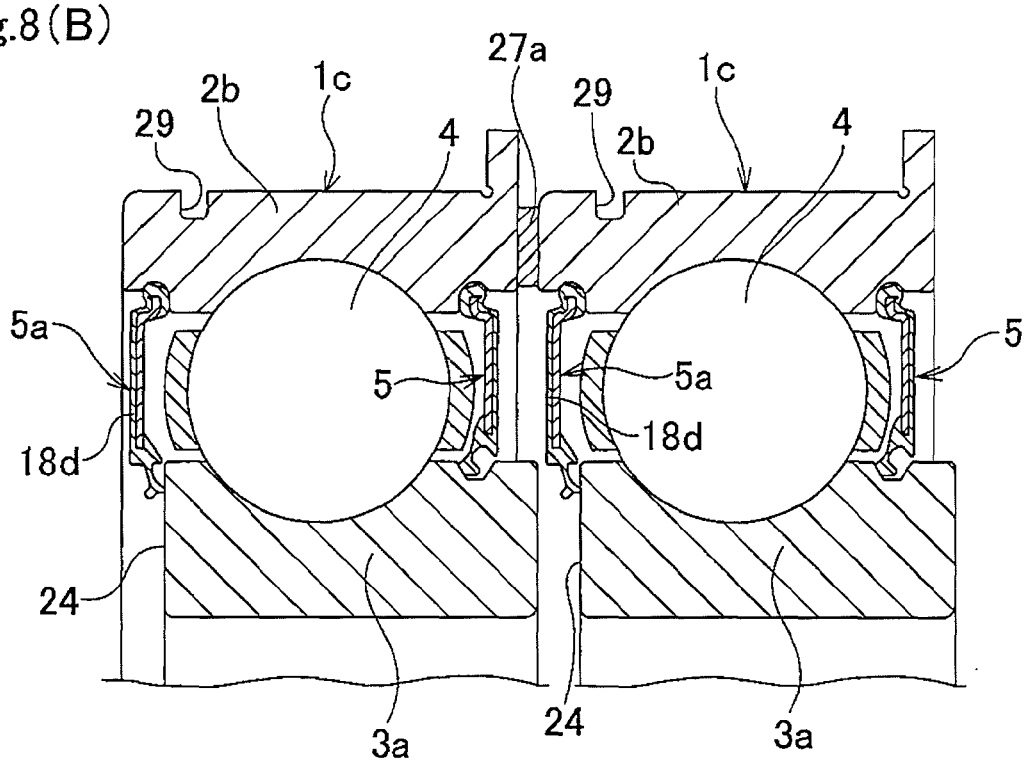
FIG. 8B is a partial cross-sectional view of another example.

FIG. 8A and FIG. 8B illustrate a fourth example of an embodiment of the present invention and variation thereof. In the case of the fourth example illustrated in FIG. 8A, with the rolling bearing 1b with seal ring in an assembled state, while the one end surface 24 in the axial direction of the inner ring 3a is located in a position that is further recessed in the axial direction than the one end surface in the axial direction of the outer ring 2b, or in other words, in a portion near the center in the axial direction of the rolling bearing 1b with seal ring, the other end surface in the axial direction of the outer ring 2b is located in a position that is further recessed in the axial direction than the other end surface in the axial direction of the inner ring 3a, or in other words, in a portion near the center in the axial direction of the inner ring 3a. The dimension W that the one end surface 24 of the inner ring 3a is recessed further toward the center side in the axial direction of the rolling bearing 1b with seal ring than the one end surface of the outer ring 2b is greater than the dimension w that the other end surface of the outer ring 2b is recessed to the center side in the axial direction of the rolling bearing 1b with seal ring than the other end surface of the inner ring 3a (W>w). Moreover, the dimension W is regulated to a size such that the seal ring 5a that is assembled on one end portion in the axial direction of the rolling bearing 1b with seal ring does not protrude further outward in the axial direction than the one end surface of the outer ring 2b. Also, the dimension w is regulated to a size so that the seal ring 5 that is assembled on the other end portion in the axial direction of the rolling bearing 1b with seal ring does not protrude further outward in the axial direction than the other end surface of the inner ring 3a. Moreover, in this example, the diameter of the inner-circumferential edge of the one end surface of the elastic member 18c is greater than the outer diameter of the other end portion of the inner ring 3a.

In this example, when transporting many rolling bearings 1b with seal rings from a plant where the rolling bearings 1b with seal rings are manufactured to a transmission assembly plant, even when the rolling bearings 1b with seal rings are placed together in the axial direction as illustrated in FIG. 8A, the seal rings 5a, 5 do not interfere with part of the adjacent rolling bearing 1b with seal ring, so it is possible to prevent damage to the seal rings 5a, 5. Furthermore, in this example, with rolling bearings 1b with seal rings placed together in the axial direction, one end portion of the outer ring 2b of the adjacent rolling bearing 1b with seal ring is located on the outer-diameter side of the other end portion of the inner ring 3a, so it is possible to shorten the dimension in the axial direction when many rolling bearings 1b with seal rings are placed together. Therefore, it is possible to improve the efficiency of the work of transporting the rolling bearings 1b with seal rings.

Moreover, in the case of the construction of the variation of the fourth example illustrated in FIG. 8B, the diameter of the inner-circumferential edge of the one end surface of the elastic member 18d is smaller than the outer diameter of the other end portion of the inner ring 3a. In the case of this kind of construction illustrated in FIG. 8B, when rolling bearings 1c with seal ring are placed together in the axial direction, a ring-shaped spacer 27a is held between adjacent outer rings 2b. Therefore, even though it is not possible to shorten the dimension in the axial direction when rolling bearings 1c with seal rings are placed together in the axial direction, it is possible to keep the worsening of the efficiency of the transporting work to a minimum. The construction and functions of the other parts are the same as in the first embodiment.

EXPLANATION OF REFERENCE NUMBERS 1, 1a to 1c Rolling bearing with seal ring
2, 2a, 2b Outer ring
3, 3a, 3b Inner ring
4 Ball
5, 5a, 5b Seal ring
6 Shield ring
7, 7a Cage
8 Outer ring raceway
9 Inner ring raceway
10, 10a Metal core
11, 11a Elastic fastening portion
12, 12a Seal lip
13a to 13c Fastening groove
14a, 14b Stepped surface
15 Shaft
16 Fastening groove
17 Stopper ring
18, 18a, 18b Elastic member
19, 19a, 19b Labyrinth seal
20 Protruding portion
21 Connecting portion
22 Thick portion
23 Sliding contact edge
24, 24a One end surface
25, 25a, 25b Space
26 Internal bearing space
27, 27a Spacer
28 Protruding shoulder portion
29 Stopper-ring groove

What is claimed is:

1. A rolling bearing with seal ring, the roller bearing comprising:
   an outer ring that is provided with an outer ring raceway around an inner-circumferential surface thereof;
   an inner ring that is provided with inner ring raceway around an outer-circumferential surface thereof, and that is located on an inner-diameter side of the outer ring so as to be concentric with the outer ring;
   a plurality of rolling bodies that are located in an internal bearing space that is formed between the outer ring and the inner ring, and that are arranged between the inner ring raceway and the outer ring raceway so as to be able to roll freely; and
   a seal ring that is formed into a circular ring shape and comprises: a fastening portion that is provided around one circumferential edge portion of an inner-circumferential edge portion and outer-circumferential edge portion, and that is fastened to at least one end portion of one of the outer ring and inner ring; and a seal lip that is made of an elastic material, that is provided around other circumferential edge portion of the inner-circumferential edge portion and outer-circumferential edge portion, a tip-end edge of which comes in sliding contact with one end surface of the other of the outer ring and inner ring; the seal ring separating the internal bearing space and an external space;
   the seal lip comprising a plate-shaped connecting portion that is formed in a portion near a center in a radial direction than the tip-end edge; and a thick portion that is continuous from the connecting portion and having a thickness dimension that is greater than the connecting portion; and the tip-end edge being composed of an end edge in an axial direction of the thick portion;
   wherein the fastening portion is fastened to the one end portion of the outer ring, the tip-end edge of the seal lip comes in sliding contact with the one end surface of the inner ring, and the one end surface of the inner ring is located at a position further recessed in the axial direction than the one end surface of the outer ring;
   wherein the other end surface of the outer ring is located at a position that is further recessed in the axial direction than the other end surface of the inner ring, and the dimension of the amount that the one end surface of the inner ring is further recessed in the axial direction is greater than the dimension of the amount that the other end surface of the outer ring is further recessed in the axial direction than the other end surface of the inner ring.

2. A rolling bearing with seal ring, comprising:
   an outer ring that is provided with an outer ring raceway around an inner-circumferential surface thereof;
   an inner ring that is provided with an inner ring raceway around an outer-circumferential surface thereof, and that is located on an inner-diameter side of the outer ring so as to be concentric with the outer ring;
   a plurality of rolling bodies that are located in an internal bearing space that is formed between the outer ring and the inner ring, and that are arranged between the inner ring raceway and the outer ring raceway so as to be able to roll freely; and
   a seal ring that is formed into a circular ring shape and comprises: a fastening portion that is provided around one circumferential edge portion of an inner-circumferential edge portion and outer-circumferential edge portion, and that is fastened to at least one end portion of one of the outer ring and inner ring and a seal lip that is made of an elastic material, that is provided around other circumferential edge portion of the inner-circumferential edge portion and outer-circumferential edge portion, a tip-end edge of which comes in sliding contact with one end surface of the other of the outer ring and inner ring; the seal ring separating the internal bearing space and an external space;
   the seal lip comprising a plate-shaped connecting portion that is formed in a portion near a center in a radial direction than the tip-end edge; and a thick portion that is continuous from the connecting portion and having a thickness dimension that is greater than the connecting portion; and the tip-end edge being composed of an end edge in an axial direction of the thick portion;
   wherein the fastening portion is fastened to a fastening groove that is formed in the inner-circumferential surface of the one end portion of the outer ring, the tip-end edge of the seal lip comes in sliding contact with the one end surface of the inner ring, and the one end surface of the inner ring is located at a position that is further recessed in the axial direction than the one end surface of the outer ring;
   wherein the rolling bearing with seal ring further comprises a second seal ring that is formed into a circular ring shape, that has: a second fastening portion provided around the outer-circumferential edge portion of the seal ring, and fastened to a fastening groove that is formed around the inner-circumferential surface of the other end portion of the outer ring; and a second seal lip made of an elastic material, provided around the inner-circumferential edge portion of the seal ring, a tip-end edge of which comes in sliding contact with part of the inner ring; the second seal ring separating the internal bearing space from external space; and wherein
   wherein by making the diameters of the second fastening portion and the second fastening groove of the second seal ring different from the diameters of the fastening portion and the fastening groove of the seal ring, error in assembling the seal ring and the second seal ring is prevented.

* * * * *